United States Patent Office 3,632,581
Patented Jan. 4, 1972

3,632,581
SCHIFF BASES OF QUINOXALINE-2-CARBOXAL-
DEHYDES AND THEIR REDUCTION PRODUCTS
John R. Potoski, Rosemont, and Meier E. Freed, Philadelphia, Pa., assignors to American Home Products Corporation, New York, N.Y.
No Drawing. Filed Oct. 8, 1968, Ser. No. 765,975
Int. Cl. C07d 51/78
U.S. Cl. 260—247.5 R                26 Claims

ABSTRACT OF THE DISCLOSURE

This invention concerns Schiff bases of quinoxaline-2-carboxaldehydes and the reduction products thereof which are pharmacologically active as central nervous system depressants.

---

The present invention relates to new and novel Schiff bases of quinoxaline-2-carboxaldehydes and their corresponding reduction products which in standard and accepted pharmacological tests have demonstrated central nervous system depressant activity which is useful in producing a calming effect in animals. Further, the Schiff bases of these quinoxaline-2-carboxaldehydes are useful intermediates in the preparation of their corresponding reduction products.

The new and novel compounds within the scope of the present invention are depicted by the following structural formulae:

![Structural formulae A and B]

wherein $R_1$ and $R_2$ are both selected from the group consisting of hydrogen, hydroxy, halogen, lower alkyl and lower alkoxy; $R_3$ which is selected from the group consisting of hydroxy(lower)alkyl, phen(lower)alkyl, phen(lower)alkoxy(lower)alkyl, halophen(lower)alkyl, lower alkylphen(lower)alkyl; lower alkoxyphen(lower)alkyl; di(lower)alkoxyphen(lower)alkyl, phenhydroxy(lower) alkyl, lower alkylpiperidyl, tetrahydrofurfuryl, morpholino(lower)alkyl, cyclohexyl, cycloheptyl, cyclooctyl, cyclononyl, cyclodecyl, cyclohendecyl and adamantyl; and the pharmacologically acceptable acid addition salts of the compounds of Formula B. As employed herein the terms "lower alkyl," "lower alkoxy" and the like are meant to include both branched and straight chain hydrocarbon moieties containing from one to about seven carbon atoms. Typical examples of the compounds of this invention are: 2-(N-benzylformimidoyl)quinoxaline; 2-(benzylaminomethyl) - 1,2,3,4 - tetrahydroquinoxaline hydrochloride; 2 - [(2 - quinoxalinylmethylene)amino]ethanol; 2 - ([(1,2,3,4 - tetrahydro - 2 - quinoxalinyl)methyl]amino)ethanol, fumarate; α-([(2-quinoxalinylmethylene)amino]methyl)benzyl alcohol; α-([(1,2,3,4-tetrahydro-2-quinoxalinylmethyl)amino]methyl)benzyl alcohol, fumarate; 2 - [N - (2 - morpholinoethyl)formimidoyl] quinoxaline; and 1,2,3,4-tetrahydro-2-[(2-morpholinoethylamino)methyl]quinoxaline fumarate, ethanolate.

The new and novel compounds of the present invention may be prepared by the process which is hereinafter schematically illustrated.

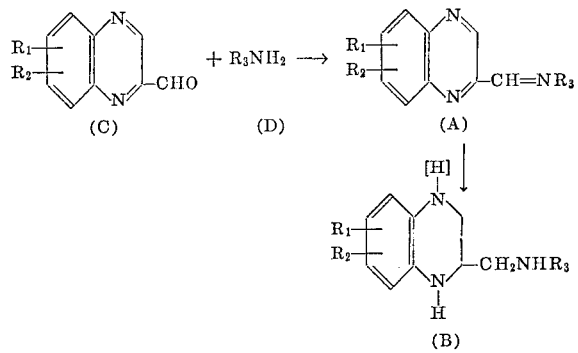

wherein $R_1$, $R_2$ and $R_3$ are defined as above. The Schiff base formation is effected by contacting a quinoxaline-2-carboxaldehyde (C) with an appropriate amine (D) in a reaction-inert organic solvent for a period of about one to about three hours at a temperature range from about 25° C. to about the reflux temperature of the reaction mixture. Preferably this reaction is conducted in benzene at reflux temperatures for a period of about one and a half hours with the removal of water by azeotropic distillation.

When the above reaction is complete, the resulting quinoxaline-2-carboxaldehyde Schiff base (A) is separated by conventional recovery procedures e.g. the solvent is evaporated and the residue recrystallized from a suitable solvent e.g. hexane, tetrahydrofuran, cyclohexane, an ethyl-acetate-cyclohexane mixture and the like.

The hydrogenation reaction may be effected by contacting an above-prepared quinoxaline-2-carboxaldehyde Schiff base (A) with hydrogen, in the presence of a platinum oxide catalyst, in tetrahydrofuran for a period of about one to about six hours at an initial hydrogen pressure of about 30 p.s.i. to about 75 p.s.i. (pounds/square inch). When the hydrogenation is complete, the resulting product (B) is separated by standard recovery techniques e.g. the catalyst is removed by filtration and then concentrate the filtrate.

Since many of the above-prepared reduction products (B) of the present invention are basic, advantage may be taken of the water solubility of salts of these compounds formed with acids in the isolation and/or purification of these compounds (B) and in the preparation of aqueous solutions thereof for oral or parenteral administration. Of course, only salts formed with pharmacologically-acceptable acids should be employed in biological applications. Particularly effective salts are those formed with pharmacologically-acceptable acids having a pK value of 3 or lower. Such acids are well known in the art, for example, hydrochloric, hydrobromic, sulfuric, nitric, phosphoric, fumaric, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed. As employed above the term "reaction-inert organic solvent" is meant to include any organic liquid which will dissolve the reactants without interfering with their interaction. Many such solvents will readily suggest themselves to one skilled in the chemical art, e.g. benzene, toluene, xylene, ether, cyclohexane, dimethylformamide, dioxan, ethanol, hexane and the like. The quinoxaline-2-carboxaldehydes (C) employed as reactants in the above process are readily prepared by the oxidation of their corresponding 2-methylquinoxalines using selenium dioxide as described by Landquist et al. in J. Chem. Soc., pg. 2052 (1956). Alternatively, these compounds (C) can be prepared by the procedure described by Henseke et al. in Liebigs Ann. Chem. 684, pg. 146 (1965). The amines (D) which are employed as starting materials are either commercially available or are readily prepared by procedures well known in the art.

The new and novel Schiff bases of quinoxaline-2-carboxaldehydes (A) and their reduction products (B) of the present invention possess valuable pharmacological properties. In particular, these compounds [(A) and (B)] in standard pharmacological procedures demonstrate nervous system activity and are useful as depressants. Because of this property they have utility in producing a calming effect in animals.

In the pharmacological evaluation of the central nervous system depressant compounds of this invention the in vivo effects of the compounds of this invention are tested as follows:

The compound is administered orally and/or intraperitoneally to three mice (14 to 24 grams) at each of four different doses. The animals are watched for a minimum of two hours during which times signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate Method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anticonvulsant activity.

The new and novel Schiff bases of quinoxaline-2-carboxaldehydes (A) and their reduction products (B) of this invention in the above test procedure when administered orally and intraperitoneally induce decreased motor activity and decreased respiration at a dosage range of about 10 mg. to about 400 mg./kilo of animal body weight. There are no deaths in the test animals at the highest oral and intraperitoneal dose used, 400 mg./kg. It is of course recognized that the quinoxaline-2-carboxaldehyde Schiff bases (A) of this invention are also useful as intermediates in the preparation of their corresponding reduction products (B).

Some of the new and novel compounds of the present invention have also demonstrated anti-amebic properties. In particular, these compounds have demonstrated activity against *Endameba histolytica* when tested by a procedure as described by Thompson et al. in Antibio and Chemo., 6, 337–50 (1956). The compounds of this invention which demonstrate this anti-amebic activity are hereinafter listed in Table I. The end point is expressed as the percent of *E. histolytica* killed by a particular concentration ($\mu$g/ml.) of compound after forty-eight hours incubation at 35° C.

TABLE I

| Compound | Concentration ($\mu$g./ml.) | Percent killed |
|---|---|---|
| 2-(benzylaminomethyl)-1,2,3,4-tetrahydro-quinoxaline, hydrochloride | 15.6 | 100 |
| | 7.8 | 87 |
| 2-[(m-chlorobenzylamino)methyl]-1,2,3,4-tetrahydroquinoxaline, hydrochloride | 125 | 100 |
| | 62.5 | 53 |
| 2-[(p-chlorobenzyl-amino)methyl]-1,2,3,4-tetrahydroquinoxaline, fumarate | 250 | 99 |
| 2-[N-(2-morpholinoethyl) formimidoyl] quinoxaline | 250 | 98 |
| $\alpha$-[((1,2,3,4-tetrahydro-2-quinoxalinylmethyl)amino] methyl]benzyl alcohol, fumarate | 250 | 97 |
| 2-[N-(tetrahydrofurfuryl)formididoyl] quinoxaline | 250 | 95 |
| 2-[(2-benzyloxyethylamino)methyl]-1,2,3,4-tetrahydroquinoxaline, fumarate | 250 | 90 |

The above-mentioned compounds of this invention which have demonstrated anti-amebic activity can be utilized for washing equipment in hospitals and homes, instruments used in medicine and bacteriology, clothes used in bacteriological laboratories, and floors, walls and ceilings in rooms in which a background of *E. histolytica* is not desired.

When the quinoxaline-2-carboxaldehyde Schiff bases (A) and their reduction products (B) of this invention are employed as central nervous system depressants they may be administered to warm-blooded animals, e.g., mice, rats, rabbits, dogs, cats, monkeys, etc. alone or in combination with pharmacologically-acceptable carriers, the proportion of which is determined by the solubility and chemical nature of the compounds, chosen route of administration and standard biological practice. For example, they may be administered orally in the form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

A mixture of 11.8 g. (0.080 mole) quinoxaline-2-carboxaldehyde, 8.56 g. (0.080 mole) benzylamine and 160 ml. of benzene is stirred and heated at its reflux temperature for one and a half hours with a Dean-Stark trap for removal of water by azeotropic distillation. The benzene is removed in vacuo to give 19 g. (96% yield) of crude product with M.P. 88–92° C. Recrystallization of the crude product twice (once treated with norit) from hexane yields 14.5 g. (74% yield) of 2-(N-benzylformimidoyl)quinoxaline, M.P. 90–92°.

*Analysis.*—Calc'd for $C_{16}H_{13}N_3$ (percent): C, 77.71; H, 5.30; N, 16.99. Found (percent): C, 77.42; H, 5.09; N, 16.95.

In a similar manner, reacting 6-methylquinoxaline-2-carboxaldehyde with phenethylamine affords 2-(N-phenethylformimidoyl)-6-methylquinoxaline.

EXAMPLE II

A mixture of 4.9 g. (0.20 mole) 2-(N-benzylformimidoyl)quinoxaline, 300 mg. of platinum oxide and 75 ml. of tetrahydrofuran is hydrogenated for sixty-five minutes with an initial hydrogen pressure of 32 p.s.i. The catalyst is filtered and the filtrate concentrated to a dark oil which partially crystallizes. The oil is triturated with ethylacetate and filtered. The filtrate is concentrated and the residue treated with one equivalent of hydrochloric acid in 25 ml. of water. The resulting mixture is concentrated and the residue recrystallized from methanol twice (once treated with norit) to afford 2.85 g. (49% yield) of 2-(benzylaminomethyl)-1,2,3,4-tetrahydroquinoxaline hydrochloride, M.P. 228–231° C.

*Analysis.*—Calc'd for $C_{16}H_{20}N_3Cl$ (percent): C, 66.35; H, 6.91; N, 14.50; Cl, 12.23. Found (percent): C, 66.62; H, 7.13; N, 14.23; Cl, 12.47.

In a similar manner, 2-(N-phenethylformimidoyl)-6-methylquinoxaline is hydrogenated to yield 2-(phenethylaminomethyl)-6-methyl-1,2,3,4-tetrahydroquinoxaline hydrochloride.

EXAMPLE III

By using the procedure of Example I, 2.4 g. (0.015 mole) quinoxaline-2-carboxaldehyde and 0.91 g. (0.015 mole) ethanolamine are reacted in 50 ml. of benzene to obtain 3.1 g. of crude product, M.P. 90–96° C. Recrystallization of the crude product from ethylacetate-cyclohexane (treated with norit once) twice gives 1.8 g. (60% yield) of product, M.P. 103–106° C. On further recrystallization from ethylacetate-cyclohexane there is obtained 2 - [(2-quinoxalinylmethylene)amino]ethanol, M.P. 105–7° C.

*Analysis.*—Calc'd for $C_{11}H_{11}N_3O$ (percent): C, 65.67; H, 5.51; N, 20.88. Found (percent): C, 65.73; H, 5.36; N, 21.08.

EXAMPLE IV

A mixture of 4.0 g. (0.020 mole) of 2[(2-quinoxalinylmethylene)amino]ethanol, 400 mg. of platinum oxide and 50 ml. of tetrahydrofuran is hydrogenated for four hours with an initial hydrogen pressure of 41 p.s.i. The catalyst is filtered and the filtrate concentrated. The residue is dissolved in a small amount of acetone and treated with a saturated solution of fumaric acid in acetone. The resulting mixture is filtered and the collected salt is recrystallized from ethanol to give 1.96 g. (37% yield) of 2-([(1,2,3,4-tetrahydro - 2 - quinoxalinyl)methyl]amino) ethanol, fumarate, M.P. 162–5° C., analytical sample, M.P. 163–5° C.

*Analysis.*—Calc'd for $(C_{11}H_{17}N_3O)_2C_4H_4O_4$ (percent): C, 58.85; H, 7.22; N, 15.84. Found (percent): C, 58.64; H, 7.18; N, 16.00.

EXAMPLE V 1.6 g. (0.010 mole) of quinoxaline-2-carboxaldehyde and 1.4 g. (0.010 mole) 2-amino-1-phenylethanol in 50 ml. of benzene are reacted as in Example I to afford an oil which on crystallization from cyclohexane gives 1.75 g. (63% yield) of product, M.P. 102–105° C. On further recrystallization from cyclohexane there is obtained α-([(2 - quinoxalinylmethylene)amino]methyl)benzyl alcohol, M.P. 103–5° C.

*Analysis.*—Calc'd for $C_{17}H_{15}N_3O$ (percent): C, 73.63; H, 5.45; N, 15.15. Found (percent): C, 73.90; H, 5.31; N, 14.96.

The above-prepared α-([(2 - quinoxalinylmethylene)amino]methyl)benzyl alcohol is hydrogenated by the procedure of Example IV, except that the initial hydrogen pressure employed is 30.5 p.s.i. Recrystallization of the resulting product from ethanol yields α-([(1,2,3,4-tetrahydro - 2 - quinoxalinylmethyl)amino]methyl)benzyl alcohol, fumarate (34% yield), M.P. 200–2° C. (dec.), analytical sample, M.P. 203–4° C. (dec.).

*Analysis.*—Calc'd for $(C_{17}H_{21}N_3O)_2C_4H_4O_4$ (percent): C, 66.84; H, 6.79; N, 12.31. Found (percent): C, 66.24; H, 6.73; N, 12.30.

EXAMPLE VI

This compound is prepared by the procedure used in Example I. From 2.7 g. (0.017 mole) quinoxaline-2-carboxaldehyde, 1.94 g. (0.017 mole) 4-amino-N-methylpiperidine and 50 ml. of benzene, there is obtained a crude product which on recrystallization from cyclohexane gives 3.0 g. (70% yield) of pure 2-[N-(1-methyl-4-piperidyl)formimidoyl]quinoxaline, M.P. 105–7° C.

*Analysis.*—Calc'd for $C_{15}H_{18}N_4$ (percent): C, 70.83; H, 7.13; N, 22.03. Found (percent): C, 70.52; H, 7.03; N, 22.09.

The above prepared 2-[N-(1-methyl-4-piperidyl)formimidoyl]quinoxaline is hydrogenated by the procedure of Example IV to afford 1,2,3,4-tetrahydro-2-[(1-methyl-4-piperidyl)aminomethyl]quinoxaline, fumarate M.P. 235–237° C. (dec.); analytical sample, M.P. 236–237° C. (dec.).

*Analysis.*—(Calc'd for $C_{15}H_{24}N_4 \cdot C_4H_4O_4$ (percent): C, 60.62; H, 7.50; N, 14.88. Found (percent): C, 60.18; H, 7.35; N, 14.51.

EXAMPLE VII

Using the procedure of Example I, to react 1.6 g. (0.010 mole) of quinoxaline-2-carboxaldehyde and 1.8 g. of (0.010 mole) of 3,4-dimethoxyphenethylamine in 60 ml. of benzene, there is obtained 3.1 g. of crude product with M.P. 115–119° C. Recrystallization of the crude product twice from cyclohexanebenzene gave 2.7 g. (84% yield) of 2 - [N - (3,4-dimethoxyphenethyl)formimidoyl] quinoxaline, M.P. 120–1° C.

*Analysis.*—Calc'd for $C_{19}H_{19}N_3O_2$ (percent): C, 71.01; H, 5.96; N, 13.08. Found (percent): C, 70.84; H, 5.97; N, 13.13.

When the above-prepared 2-[N-(3,4-dimethoxyphenethyl) formimidoyl]quinoxaline is hydrogenated, using the procedure of Example IV, there is obtained 2-[(3,4-dimethoxyphenethylamino)methyl] - 1,2,3,4-tetrahydroquinoxaline fumarate (39% yield), M.P. 205–7° C.

*Analysis.*—Calc'd for $(C_{19}H_{25}O_2N_3)_2C_4H_4O_4$ (percent): C, 65.43; H, 7.06; N, 10.90. Found (percent): C, 65.62; H, 7.23; N, 10.56.

EXAMPLE VIII

Repeating the procedure of Example I to react 2.0 g. (0.010 mole) of adamantylamine and 1.6 g. (0.010 mole) of quinoxaline-2-carboxaldehyde in 50 ml. of benzene, there is obtained 2.9 g. of tan powder, M.P. 128–133° C. Recrystallization of the powder from cyclohexane twice gives 1.55 g. (53% yield) of 2-[N-(1-adamantyl)formimidoyl]quinoxaline, M.P. 137–9° C.

*Analysis.*—Calc'd for $C_{19}H_{21}N_3$ (percent): C, 78.31; H, 7.26; N, 14.42. Found (percent): C, 78.23; H, 7.22; N, 14.70.

Hydrogenation of the above-prepared product by the procedure of Example IV affords 2-[(1-adamantylamino)methyl]-1,2,3,4-tetrahydroquinoxaline, fumarate, M.P. 266–8° C. (dec.).

*Analysis.*—Calc'd for $(C_{19}H_{27}N_3)_2C_4H_4O_4$ (percent): C, 70.95; H, 8.22; N, 11.82. Found (percent): C, 71.21; H, 8.19; N, 11.73.

EXAMPLE IX

When the procedure of Example I is repeated to react 3.2 g. (0.020 mole) quinoxaline-2-carboxaldehyde and 2.8 g. (0.020 mole) of 3-chlorobenzylamine in 50 ml. of benzene, there is obtained 5.7 g. of crude product, M.P. 84–87° C. Recrystallization of the crude product gives 4.9 g. (87% yield) of 2-[N-(m-chlorobenzyl)formimidoyl]quinoxaline, M.P. 90–2° C.

*Analysis.*—Calc'd for $C_{16}H_{12}N_3Cl$ (percent): C, 68.26; H, 4.29; N, 14.90; Cl, 12.58. Found (percent): C, 68.42; H, 4.21; N, 14.78; Cl, 12.82.

The above-prepared 2[N-(m-chlorobenzyl)formimidoyl]quinoxaline is hydrogenated by the procedure of Example II to yield 2[(m-chlorobenzylamino)methyl]-1,2,3,4-tetrahydroquinoxaline, hydrochloride (42% yield)), M.P. 197–9° C.

*Analysis.*—Calc'd for $C_{16}H_{19}N_3Cl_2$ (percent): C, 59.30; H, 5.91; N, 12.95; Cl, 21.86. Found (percent): C, 59.19; H, 5.79; N, 12.79; Cl, 21.88.

EXAMPLE X

Repeating the procedure of Example I to react 2.0 g. (0.020 mole) of tetrahydrofurfurylamine and 3.2 g. (0.020 mole) of quinoxaline-2-carboxaldehyde in 50 ml. of benzene, there is obtained 4.5 g. of brown solid which is recrystallized from hexane (treated with norit) to yield 3.30 g. (68% yield) of 2-[N-(tetrahydrofurfuryl)formimidoyl]quinoxaline, M.P. 54–6° C.

*Analysis.*—Calc'd for $C_{14}H_{15}N_3O$ (percent): C, 69.89; H. 6.27; N, 17.42. Found (percent): C, 69.79; H, 6.11; N, 17.34.

When the above-prepared product is hydrogenated by the procedure of Example IV, there is obtained 1,2,3,4- tetrahydro - 2 - [(tetrahydrofurfurylamino)methyl]quinoxaline, fumarate, M.P. 202–5° C. (dec.).

*Analysis.*—Calc'd for $(C_{14}H_{21}N_3O)_2C_4H_4O_4$ (percent): C, 62.93; H, 7.59; N, 13.76. Found (percent): C, 62.87; H, 7.18; N, 13.66.

EXAMPLE XI

Employing the procedure of Example I to react 1.6 g. (0.010 mole) quinoxaline-2-carboxaldehyde and 1.5 g. (0.010 mole) 2-amino-1-phenylpropanol in 50 ml. of benzene, there is obtained an oily residue which on crystallization from chloroform-hexane and recrystallization from cyclohexane gives 1.6 g. of α-(1-[2-quinoxalinylmethylene)amino]ethyl)benzyl alcohol, M.P. 108–9° C.

*Analysis.*—Calc'd for $C_{18}H_{17}N_3O$ (percent): C, 74.20; H, 5.88; N, 14.42. Found (percent): C, 74.21; H, 5.61; N, 14.30.

When the above-prepared compound is hydrogenated by the procedure of Example IV, there is obtained α-(1-[(1,2,3,4 - tetrahydro - 2-quinoxalinylmethyl)amino]ethyl)benzyl alcohol, fumarate, M.P. 202–5° C. (dec.).

*Analysis.*—Calc'd for $(C_{18}H_{23}ON_3)_2C_4H_4O_4$ (percent): C, 67.58; H, 7.09; N, 11.82. Found (percent): C, 67.64; H, 6.93; N, 11.95.

EXAMPLE XII

Repeating the procedure of Example I to react quinoxaline-2-carboxaldehyde with p-chlorobenzylamine, there is obtained 2 - [N - (p-chlorobenzyl)formimidoyl]quinoxaline, M.P. 134–6° C.

*Analysis.*—Calc'd for $C_{16}H_{12}N_3Cl$ (percent): C, 68.26; H, 4.29; N, 14.90; Cl, 12.58. Found (percent): C, 68.46; H, 4.23; N, 14.95; Cl, 12.61.

When the above-prepared 2-[N-(p-chlorobenzyl)formimidoyl]quinoxaline is hydrogenated using the process of Example IV, there is afforded 2-[(p-chlorobenzylamino)methyl]-1,2,3,4-tetrahydroquinoxaline, fumarate, M.P. 205–7° C.

*Analysis.*—Calc'd for $(C_{16}H_{18}N_3Cl)_2C_4H_4O_4$ (percent): C, 62.54; H, 5.83; N, 12.14. Found (percent): C, 62.86; H, 5.52; N, 12.15; Cl, 10.17.

Similarly, 2 - [N-(p-bromobenzyl)formimidoyl]quinoxaline is prepared and then hydrogenated to afford 2-[(p-bromobenzylamino)methyl] - 1,2,3,4 - tetrahydroquinoxaline, fumarate.

EXAMPLE XIII

When the procedure of Example I is repeated utilizing appropriate reactants, there is obtained 2-[N-(2-benzyloxyethyl)formimidoyl]quinoxaline, M.P. 58–60° C.

*Analysis.*—Calc'd for $C_{18}H_{17}ON_3$ (percent): C, 74.24; H, 5.88; N, 14.42. Found (percent): C, 74.40; H, 5.94; N, 14.54.

The above product is then hydrogenated by the procedure of Example IV to yield 2-[(2-benzyloxyethylamino)methyl]-1,2,3,4-tetrahydroquinoxaline, fumarate, M.P. 188–90° C.

*Analysis.*—Calc'd for $(C_{18}H_{23}N_3O)_2C_4H_4O_4$ (percent): 67.58; H, 7.09; N, 11.82. Found (percent): C, 67,81; H, 6.95; N. 11.81.

EXAMPLE XIV

Repeating the procedure of Example I to react quinoxaline-2-carboxaldehyde with 2-morpholinoethylamine, there is obtained 2-[N-(2-morpholinoethyl)formimidoyl] quinoxaline, M.P. 97–9° C.

*Analysis.*—Calc'd for $C_{15}H_{18}N_4O$ (percent): C, 66.66; H, 6.71; N, 20.73. Found (percent): C, 66.51; H, 6.76; N, 20.79.

The above-prepared product is hydrogenated by the procedure of Example IV to yield 1,2,3,4-tetrahydro-2-[(2-morpholinoethylamino)methyl]quinoxaline fumarate, ethanolate, M.P. 198–200° C.

*Analysis.*—Calc'd for $(C_{15}H_{24}N_4O)_2C_4H_4O_4C_2H_5OH$ (percent): C, 60.48; H, 8.18; N, 15.68. Found (percent): C, 60.63; H, 8.20; N, 15.75.

EXAMPLE XV

A solution of 3.2 g. (0.020 mole) of quinoxaline-2-carboxaldehyde, 3.8 g. (0.020 mole) of 4-hydroxy-3-methoxy-benzylamine hydrochloride and 2.0 g. (0.020 mole) of triethylamine in 100 ml. of methanol is stirred at room temperature for fifteen minutes. The methanol is removed in vacuo to give a yellow residue. This residue is treated with chloroform and filtered. The chloroform filtrate is washed with water, dried ($MgSO_4$) and concentrated to give 5.3 g. (90% yield) of crude product with M.P. 142–9° C. Recrystallization of the crude product twice from ethyl acetate gives 3.9 g. (66% yield) of 2-methoxy - α - [(quinoxalinylmethylene)amino]-p-cresol, M.P. 146–8° C.

*Analysis.*—Calc'd for $C_{17}H_{15}N_3O$ (percent): C, 69.61; H, 5.15; N, 14.33. Found (percent): C, 69.42; H, 5.07; N, 14.27.

The above-prepared compound is then hydrogenated by the procedure of Example IV to yield 2-methoxy-α-[(1,2,3,4 - tetrahydroquinoxalinylmethylene)amino]-p-cresol, fumarate.

EXAMPLE XVI

Repeating the procedure of the prior examples to react a quinoxaline-2-carboxaldehyde with an appropriate amine the following Schiff bases of quinoxaline-2-carboxaldehydes (A) are obtained which are then hydrogenated to yield the corresponding reduction products (B):

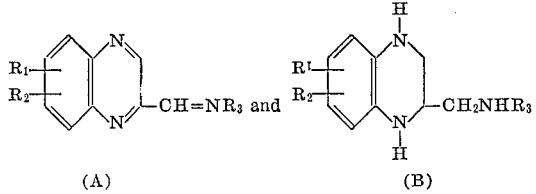

(A)    (B)

wherein $R_1$, $R_2$ and $R_3$ are defined as follows:

| $R_1$ | $R_2$ | $R_3$ |
|---|---|---|
| Hydrogen | 5-hydroxy | Hydroxyethyl. |
| 6-chloro | 7-chloro | β-hydroxyphenethyl. |
| 6-methyl | 7-bromo | 1-ethyl-4-piperidyl. |
| 7-butyl | Hydrogen | 3,5-diethoxyphenethyl. |
| 6-methoxy | 7-methoxy | p-Iodophenethyl. |
| 7-fluoro | Hydrogen | Morpholinoethyl. |
| Hydrogen | 7-ethoxy | Phenethoxypropyl. |
| 6-bromo | 7-bromo | p-Methylbenzyl. |
| 8-butyl | Hydrogen | Cyclohexyl. |
| 6-hydroxy | 7-methyl | m-Propylphenbutyl. |
| Hydrogen | 7-propoxy | Cyclooctyl. |
| Do | Hydrogen | p-Methoxyphenethyl. |
| 6-iodo | do | Cyclohendecyl. |
| Hydrogen | do | p-Ethoxybenzyl. |
| 6-chloro | do | Cyclononyl. |
| Hydrogen | 7-methyl | Cylcoheptyl. |
| Do | Hydrogen | Cyclodecyl. |
| Do | 7-methoxy | m-Fluorobenzyl. |
| Do | Hydrogen | Phenbutyl. |

What is claimed is:

1. A compound selected from the group consisting of those having the formulae:

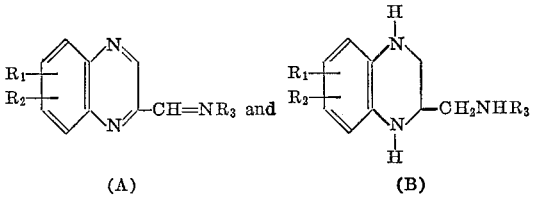

(A)    (B)

wherein $R_1$ and $R_2$ are both selected from the group consisting of hydrogen, hydroxy, halogen, lower alkyl and lower alkoxy; $R_3$ which is selected from the group consisting of hydroxy (lower)alkyl, phen(lower)alkyl, phen-(lower)alkoxy(lower)alkyl, halophen(lower)alkyl, lower alkylphen(lower)alkyl; lower alkoxyphen(lower)alkyl; di(lower)alkoxyphen(lower)alkyl, phenhydroxy(lower) alkyl, lower alkylpiperidyl, tetrahydrofurfuryl, morpholino(lower)alkyl, cyclohexyl, cycloheptyl, cyclooctyl, cyclononyl, cyclodecyl, cyclohendecyl and adamantyl;

and the pharmacologically acceptable acid addition salts of the compounds of Formula B.

2. 2-(N-benzylformimidoyl)quinoxaline.
3. 2-(benzylaminomethyl) - 1,2,3,4 - tetrahydroquinoxaline hydrochloride.
4. 2-[(2-quinoxalinylmethylene)amino]ethanol.
5. 2 - ([(1,2,3,4 - tetrahydro-2-quinoxalinyl)methyl]amino)ethanol, fumarate.
6. α - ([(2 - quinoxalinylmethylene)amino]methyl)benzyl alcohol.
7. α - ([(1,2,3,4 - tetrahydro-2-quinoxalinylmethyl)amino]methyl)benzyl alcohol, fumarate.
8. 2 - [N - (1-methyl-4-piperidyl)formimidoyl]quinoxaline.
9. 1,2,3,4 - tetrahydro - 2 - [(1-methyl-4-piperidyl)aminomethyl]quinoxaline, fumarate.
10. 2 - [N - (3,4 - dimethoxyphenethyl)formimidoyl]quinoxaline.
11. 2 - [(3,4 - dimethoxyphenethylamino)methyl] - 1,2,3,4-tetrahydroquinoxaline fumarate.
12. 2-[N-(1-adamantyl)formimidoyl]quinoxaline.
13. 2 - [(1 - adamantylamino)methyl] - 1,2,3,4 - tetrahydroquinoxaline, fumarate.
14. 2[N-(m-chlorobenzyl)formimidoyl]quinoxaline.
15. 2 - [(3 - chlorobenzylamino)methyl] - 1,2,3,4-tetrahydroquinoxaline, hydrochloride.
16. 2 - [N - (tetrahydrofurfuryl)formimidoyl]quinoxaline.
17. 1,2,3,4 - tetrahydro - 2 - [(tetrahydrofurfurylamino)methyl]quinoxaline, fumarate.
18. α - (1 - [(2 - quinoxalinylmethylene)amino]ethyl)benzyl alcohol.
19. α - (1 - [(1,2,3,4 - tetrahydro - 2 - quinoxalinylmethyl)amino]ethyl)benzyl alcohol, fumarate.
20. 2-[N-(p-chlorobenzyl)formimidoyl]quinoxaline.
21. 2 - [(p - chlorobenzylamino)methyl] - 1,2,3,4 - tetrahydroquinoxaline, fumarate.
22. 2 - [N - (2 - benzyloxyethyl)formimidoyl]quinoxaline.
23. 2 - [(2 - benzyloxyethylamino)methyl] - 1,2,3,4-tetrahydroquinoxaline, fumarate.
24. 2 - [N - (2 - morpholinoethyl)formimidoyl]quinoxaline.
25. 1,2,3,4 - tetrahydro - 2 - [(2 - morpholinoethylamino)methyl]quinoxaline fumarate, ethanolate.
26. 2 - methoxy - α - [(quinoxalinylmethylene)amino] p- cresol.

References Cited
UNITED STATES PATENTS
3,371,090 2/1968 Johnston et al. _____ 260—250
3,446,809 5/1969 Harris _____ 260—250

NICHOLAS S. RIZZO, Primary Examiner

U.S. Cl. X.R.

260—250 R; 424—248, 250